Figure 1:
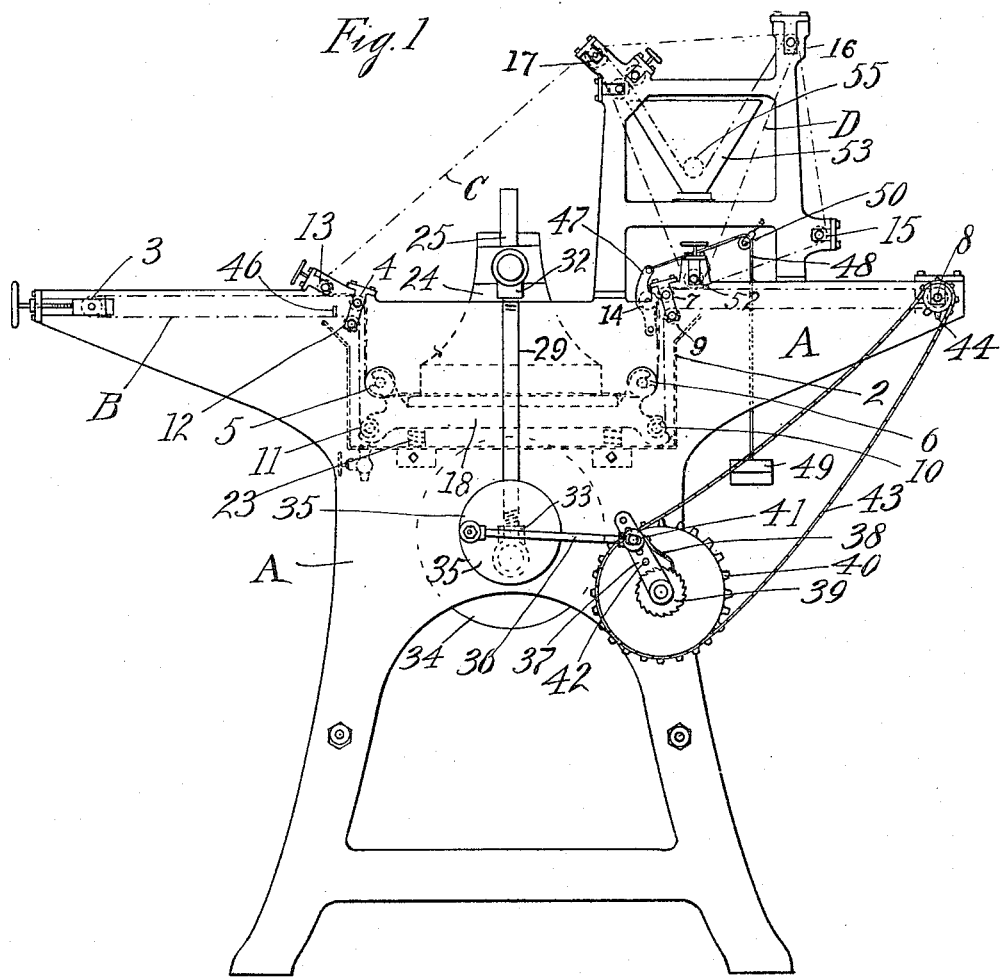

H. J. NICHOLLS.
STARCHING MACHINE.
APPLICATION FILED FEB. 11, 1909.

1,124,506.

Patented Jan. 12, 1915.
5 SHEETS—SHEET 1.

Witnesses,
George Voelker
H. Smith

Inventor,
Henry J. Nicholls
by Lothrop & Johnson
his Attorneys.

H. J. NICHOLLS.
STARCHING MACHINE.
APPLICATION FILED FEB. 11, 1909.
1,124,506.
Patented Jan. 12, 1915.
5 SHEETS—SHEET 2.
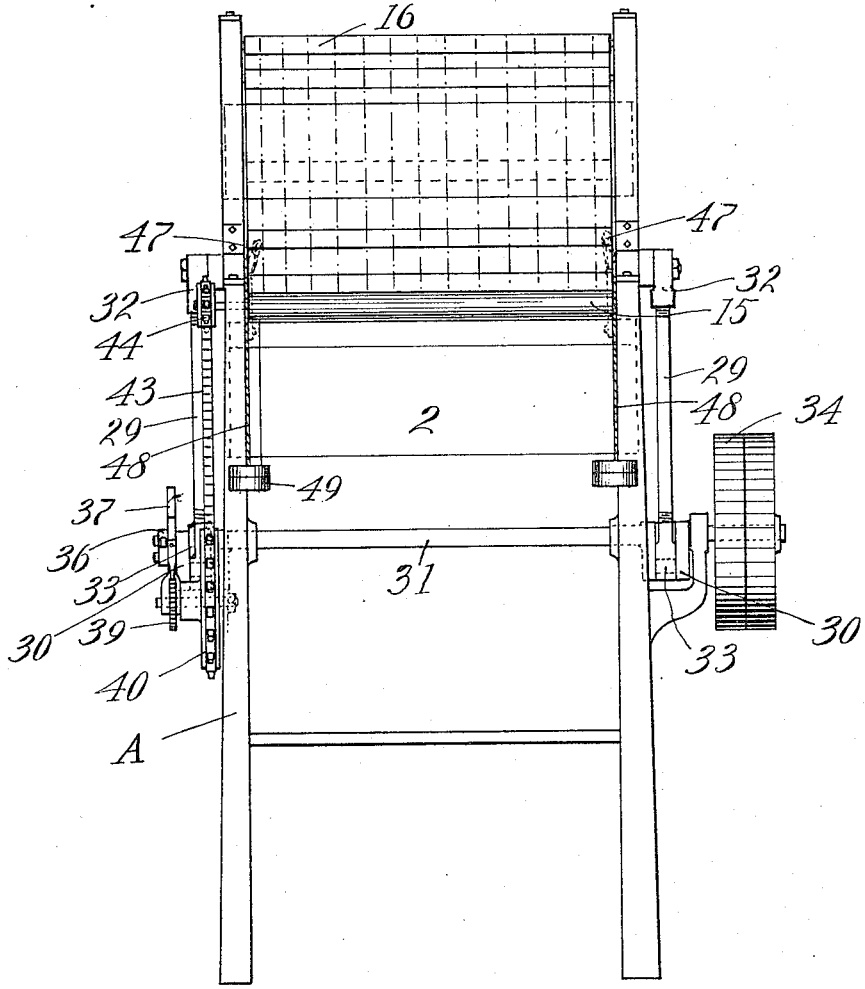
Witnesses,
George Voelker
H. Smith
Inventor,
Henry J. Nicholls
by Lothrop & Johnson
his Attorneys

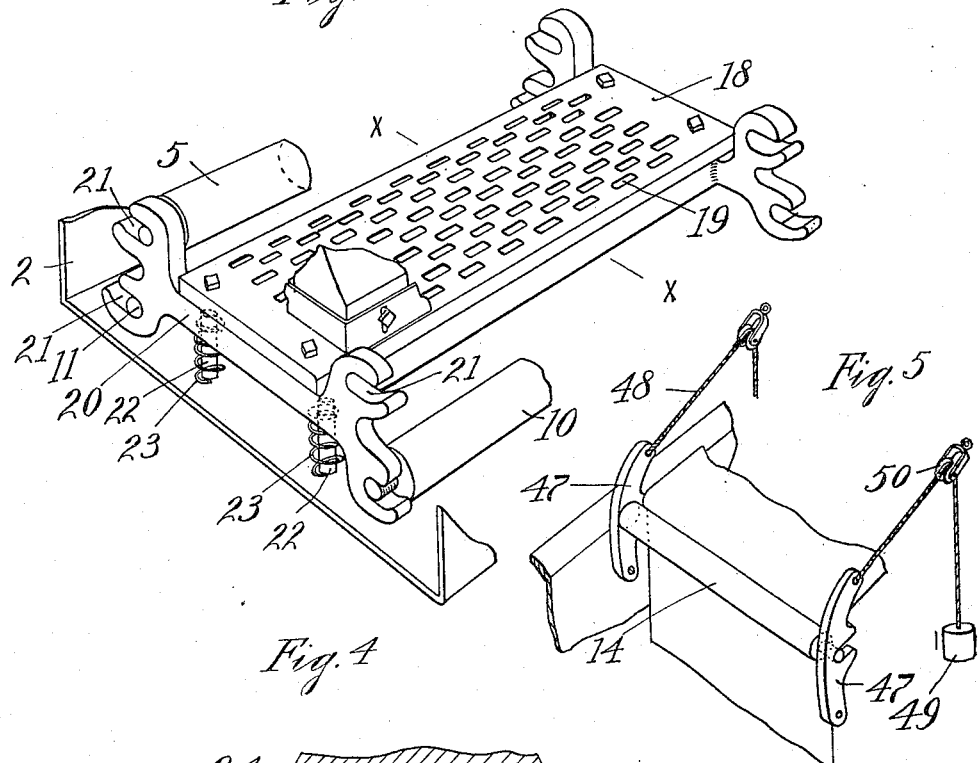
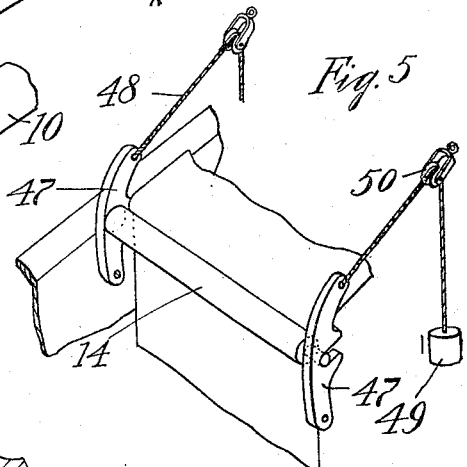
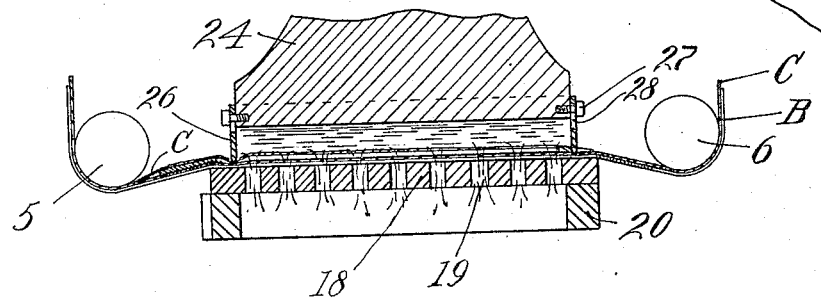

H. J. NICHOLLS.
STARCHING MACHINE.
APPLICATION FILED FEB. 11, 1909.
1,124,506.
Patented Jan. 12, 1915.
5 SHEETS—SHEET 4.
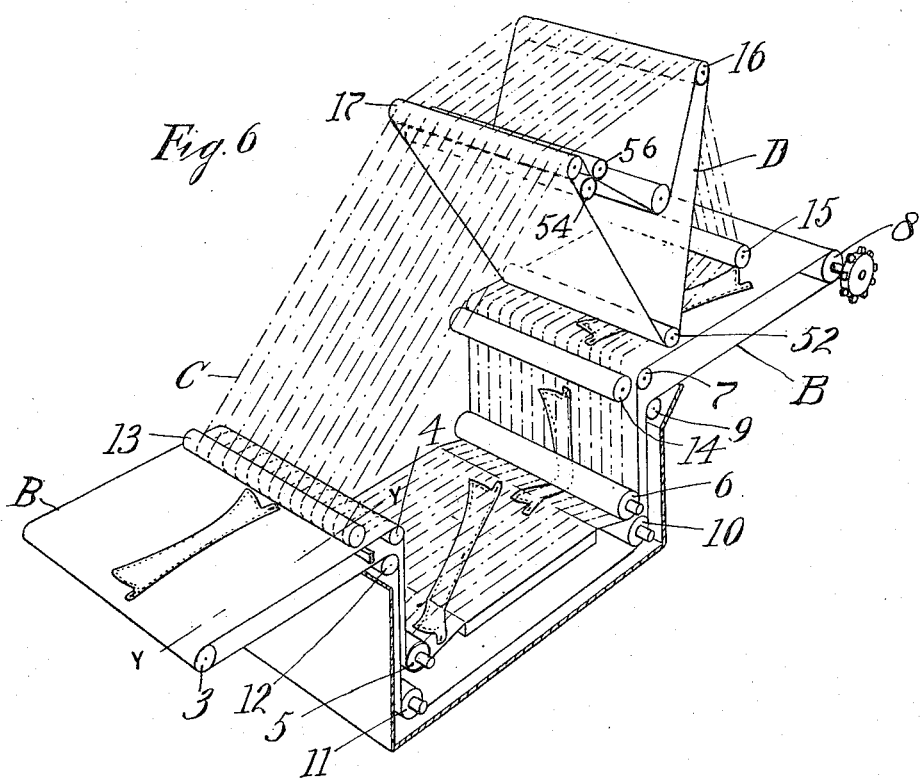
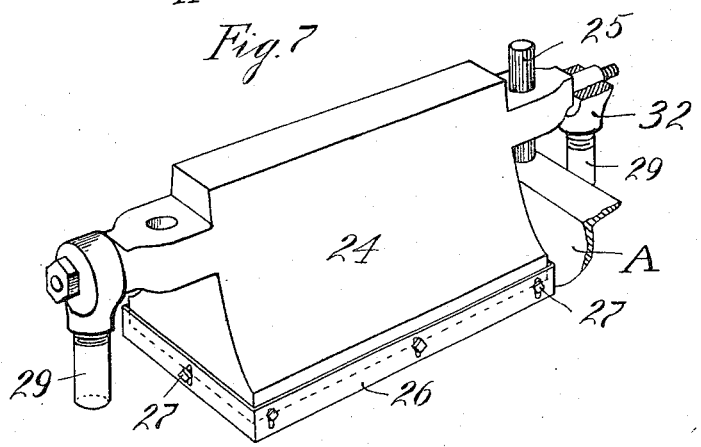
Witnesses,
George Voelker
H. Smith
Inventor,
Henry J. Nicholls
by Lothrop & Johnson
his Attorneys.

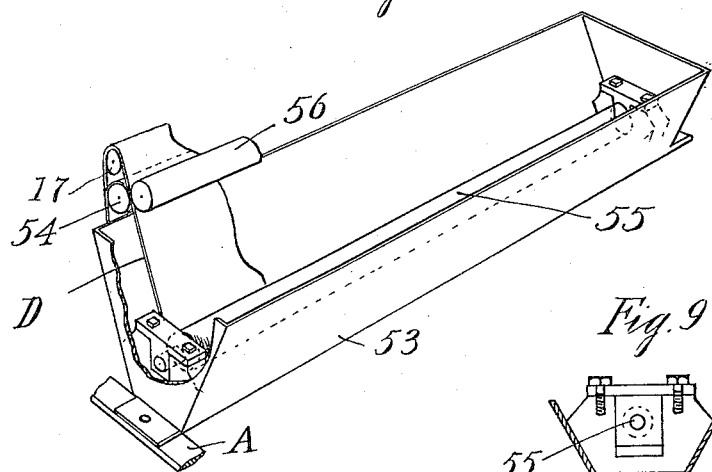
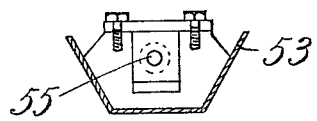
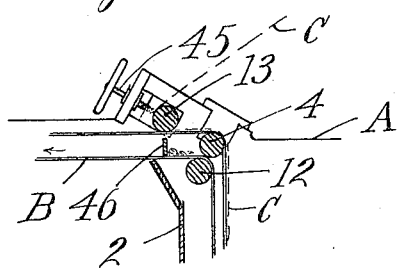
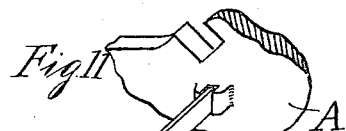
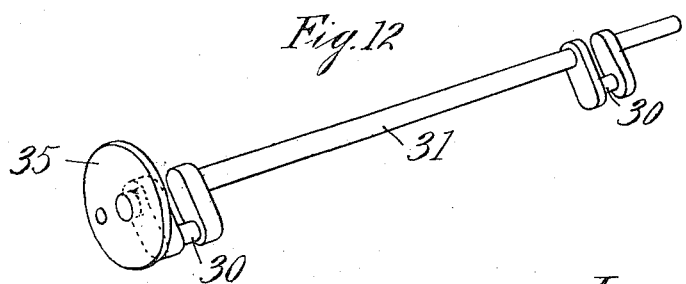

UNITED STATES PATENT OFFICE.

HENRY J. NICHOLLS, OF ST. PAUL, MINNESOTA, ASSIGNOR, BY DIRECT AND MESNE ASSIGNMENTS, TO NATIONAL CHEMICAL COMPANY, OF SYRACUSE, NEW YORK, A CORPORATION OF NEW YORK.

STARCHING-MACHINE.

1,124,506.      Specification of Letters Patent.      Patented Jan. 12, 1915.

Application filed February 11, 1909. Serial No. 477,349.

*To all whom it may concern:*

Be it known that I, HENRY J. NICHOLLS, a citizen of the United States, residing at St. Paul, in the county of Ramsey and State of Minnesota, have invented certain new and useful Improvements in Starching-Machines, of which the following is a specification.

My invention relates to improvements in starching machines designed particularly for starching collars and cuffs and consists in the features of construction and combination hereinafter more particularly described and claimed.

In the accompanying drawings forming part of this specification Figure 1 is a side elevation of my improved machine, Fig. 2 is a rear elevation of the same, Fig. 3 is a perspective view partly broken away of the mechanism for forcing the starch through the articles being treated, Fig. 4 is a section on line $x$—$x$ of Fig. 3, Fig. 5 is a perspective view of a wiping device forming part of my invention, Fig. 6 is a perspective diagrammatic view of the machine, Fig. 7 is a perspective view of a plunger forming part of the machine, Fig. 8 is a perspective view of a cleaning trough for the wiping apron, Fig. 9 is a cross section of the trough, Fig. 10 is a partial section of the machine taken on a line corresponding with line $y$—$y$ of Fig. 6, Fig. 11 is a view of scraper forming part of my invention, and Fig. 12 is a perspective view of the main crank shaft.

In the drawings A represents the framework of the machine having a central starch receptacle 2.

B represents an endless flexible apron and C an endless string apron for the purpose of holding between them cuffs and collars and carrying them through the machine. The endless apron B runs over a roller 3 having slidable support in the feed end of the machine, passing from the roller 3 over the roller 4 and downwardly and under the rollers 5 and 6 across the bottom of the starch receptacle, thence upwardly over the roller 7 and over and around the roller 8 of the machine returning over the rollers 9, 10, 11 and 12. The rollers 10 and 11 are journaled below the rollers 5 and 6 as indicated in Fig. 6.

The endless string apron passes over the roller 13 at the feed end of the machine, and thence on top of the apron B around the rollers 5 and 6. From the rollers 6 the string apron passes around rollers 7 and 15 to and over the rollers 16 and 17 of the wiping device D and from the roller 17 back to the roller 13.

Arranged in the starch receptacle below the aprons as they pass from the roller 5 to the roller 6 is a plate 18 formed with perforations 19. The plate 18 is supported on the frame 20 carrying at its opposite ends sockets 21 to receive and form a journal support for the ends of the rollers 5, 6, 10 and 11. The frame 20 has spring support upon the bottom of the receptacle 2 through the medium of the posts 22 carried by the bottom of the receptacle and slidably extending into the frame and the coil springs 23 interposed between the receptacle bottom and frame and surrounding said posts. Arranged above the frame 20 and plate 18 is a press 24 having vertically slidable support upon the top of the receptacle through the medium of posts 25 carried by the top of the frame and extending loosely through openings in the ends of the press. Slidably secured around the lower edge of the press is a loose band 26, sliding movement being provided for by pins or bolts 27 secured in the press and extending through vertical slots 28 in the band. The band extends the desired distance below the press in position to bear against the upper surface of the outer edge of the plate 18 as indicated in Fig. 4. In order to vertically reciprocate the press I provide adjustable rods 29 connecting the ends of the press with cranks 30 of the main driving shaft 31. The rods preferably have adjustable connection with the press and with the shaft by being oppositely threaded into couplings 32 and 33. Carried upon one end of the driving shaft are the belt pulleys and upon the other end an eccentric 35. The eccentric 35 is connected by an eccentric rod 36 with a lever arm 37 which carries a spring pawl 38 engaging with the ratchet 39, the ratchet being carried by the gear wheel 40. I provide, as hereinafter pointed out, slidable connection 41 between the eccentric rod and lever arm 37, the connection being adjustable as well as slidable through the medium of the series of openings 42 in the lever arm. The sprocket wheel 40 has chain connection 43 with the sprocket 44 upon the end of the roller 8 whereby the roller 8 is actuated to impart movement to the apron.

In order to apply tension to the string apron I provide in connection with the journal bearing of the roller 13 a suitable tension device 45 and in order to apply tension to the main apron B I employ in connection with the slidable support for the roller 3 a suitable tension device. In order to scrape the starch from the apron B back into the starch receptacle I provide above the apron B as it returns over the roller 12 a scraper bar 46 extending transversely of the machine directly above said apron, and I provide at the opposite end of the receptacle a wiping roller 14 journaled above the apron adjacent to the roller 7 and contacting with said apron as indicated in Fig. 6. The roller 14 is journaled in the pivoted arms 47, the upper ends of which arms are connected by cables 48 with weights 49 running intermediately over idlers 50. Thus by means of the weight and cables the roller 14 is held pressed against the aprons wiping the starch back into the receptacle. The aprons B and C are thereafter wiped by the wiping apron D which extends over the roller 52 in contact with the aprons B and C and thence upwardly over the roller 16 and through the trough 53 and thence around the roller 17 back to the roller 52. In passing through the trough the wiping apron passes under near the roller 55. In passing over the roller 54 the apron D is wiped by a suitable roller 56. The trough is kept filled with water so that the wiping apron is being constantly cleaned as it passes therethrough. It will be understood that tension may be applied to all the different rollers in any desired manner.

In operation the articles to be starched will be fed upon the apron B as indicated in Fig. 6 passing underneath the roller 13 between the apron B and the string apron C. It will thence be carried through the machine as indicated in Fig. 6 being carried between the two aprons over the perforated plate 18 and delivered from the machine as the apron B passes over the roller 8. As the collars and cuffs pass over the plate 18 the operating mechanism will raise and lower the press. Each time the press is lowered it will assume the position indicated in Fig. 4 with the band 26 in contact with the outer edges of the perforated plate 18, the starch inside the band 26 being forced by the downward movement of the press through the collars and cuffs and through the openings 19. As will be noted in Fig. 4 the rollers 5 and 6 are positioned below the top face of the plate 18 thus carrying the aprons sharply over the edge of the plate and more tightly gripping the intermediate collars and cuffs. As the aprons pass under the wiping roll 14 said roll will wipe off the surplus starch and allow it to drop back into the main receptacle 2 and the wiping apron D will thereafter more thoroughly wipe and clean the aprons. By means of the operating mechanism shown the aprons B and C will be given an intermittent movement. While the press is being lowered and is pressing the starch through the cuffs and collars, the lever 37 is being withdrawn leaving the aprons in a state of rest. While the press is being raised and is freed from the aprons the lever 37 is being carried forward to cause travel of the apron through the medium of the pawl and ratchet and sprocket and chain connection. The slot and pin connection between the eccentric rod 36 and the lever 37 allows the press to be first lifted free from the aprons before it begins to actuate the pawl and ratchet and thus the aprons do not begin to travel until the press is freed therefrom.

I claim as my invention:

1. In a machine of the class described, the combination with a tank, of a resiliently supported bed plate arranged in said tank, a reciprocating plunger supported above the same, a vertically slidable band surrounding said plunger and normally extending below the same, and means for reciprocating said plunger toward and from the said plate.

2. In a machine of the class described the combination with a tank, of a perforated resiliently supported bed plate therein, an apron passing over said plate, a plunger supported above the same, a means for alternately imparting movement to said apron and reciprocating said plunger toward and from said bed plate.

3. In a machine of the class described, the combination with a tank, of a perforated resiliently supported bed plate arranged in said tank, an apron passing over said plate, a reciprocating plunger supported above the same, means for intermittently imparting forward movement to said apron, and means for raising said plunger away from said apron slightly in advance of each forward movement of said apron.

4. In a machine of the class described, the combination with a tank, of a resiliently supported perforated bed plate, an apron passing over said bed plate and extending downwardly over said rollers at opposite ends of said plate, a reciprocating plunger arranged above said plate and means for alternately imparting forward travel to said apron and for reciprocating said plunger toward and from said plate and intermediate apron.

5. In a machine of the class described, the combination with a tank, of a perforated bed plate arranged therein, a reciprocating plunger arranged above said bed plate, conveyer aprons passing over said plate, a wiping apron arranged in connection with said conveyer aprons, means for washing said wiping apron and actuating mechanism for said aprons and said plunger.

6. In a machine of the class described, the combination with a tank, of a perforated bed plate therein, conveyer aprons passing over said plate, a reciprocating plunger arranged above said plate, a water receptacle arranged adjacent to said conveyer aprons, a wiping apron passing through said receptacle and into contact with said conveyer aprons, and actuating means for said aprons and said plunger.

7. In a machine of the class described, the combination with a bed plate of a reciprocating plunger, conveyer aprons moving between the bed plate and the plunger, a wiping apron arranged in connection with said conveyer aprons, means for washing said wiping apron, and actuating mechanism for said aprons and said plunger.

8. The combination with a tank of a bedplate arranged in said tank, a plunger movable toward and from the bed-plate, and a movable band surrounding the plunger and normally extending below the same.

9. In a machine of the class described, the combination with a tank of a bed plate arranged in said tank, a reciprocating plunger, a vertically slidable band surrounding said plunger and normally extending below the same, and means for reciprocating said plunger toward and from said plate.

10. In a machine of the class described, the combination with a tank of a perforated bed plate therein, an apron moving across said plate, a plunger, and means for alternately imparting movement to said apron and reciprocating said plunger toward and from said bed plate.

11. In a machine of the class described, the combination with a tank of a bed plate therein, an apron moving across said plate, a plunger, and means for alternately imparting movement to said apron and reciprocating said plunger toward and from said bed plate.

12. In a machine of the class described, the combination with a bed plate of an apron moving across said plate, a plunger, means for alternately imparting movement to said apron and reciprocating said plunger toward and from said bed plate.

13. In a machine of the class described, the combination with a tank of a bed plate arranged therein, a reciprocating plunger intermittingly movable means moving across said plate for feeding articles to be starched and means for bringing said plunger into pressing coaction with the bed plate only while the feeding means is at rest.

14. In a machine of the class described, the combination with a bed plate of a reciprocating plunger, one of said elements being resiliently mounted, intermittingly movable means between the plate and plunger for feeding articles to be starched, and means for raising said plunger away from said bed plate in advance of each forward movement of the feeding means.

In testimony whereof I affix my signature in presence of two witnesses.

HENRY J. NICHOLLS.

Witnesses:
H. S. JOHNSON,
H. SMITH.